United States Patent [19]

Fujiki et al.

[11] Patent Number: 5,792,812
[45] Date of Patent: Aug. 11, 1998

[54] THERMOPLASTIC RESIN COMPOISTIONS FOR USE IN INTEGRAL MOLDING WITH SILICONE RUBBER AND INTEGRALLY MOLDED PARTS

[75] Inventors: Hironao Fujiki; Shigeki Shudo, both of Gunma-ken, Japan

[73] Assignee: Shin-Etsu Chemical Co., Ltd., Tokyo, Japan

[21] Appl. No.: 579,627

[22] Filed: Dec. 26, 1995

[30] Foreign Application Priority Data

Dec. 26, 1994 [JP] Japan ................................ 6-337186

[51] Int. Cl.$^6$ .................... C08L 23/16; C08L 55/02; C08L 25/10
[52] U.S. Cl. .................... 525/105; 428/412; 428/447; 428/451; 525/106; 525/461; 525/464
[58] Field of Search .................... 525/105, 464, 525/461; 428/412, 451, 447

[56] References Cited

U.S. PATENT DOCUMENTS

| 4,582,762 | 4/1986 | Onohara et al. .................... 428/447 |
| 4,686,124 | 8/1987 | Onohara et al. .................... 428/35 |
| 4,814,231 | 3/1989 | Onohara et al. .................... 428/425.5 |
| 4,834,721 | 5/1989 | Onohara et al. .................... 604/266 |
| 5,366,805 | 11/1994 | Fujiki et al. .................... 428/412 |
| 5,366,806 | 11/1994 | Fujiki et al. .................... 428/412 |
| 5,418,065 | 5/1995 | Fujiki et al. .................... 428/451 |

FOREIGN PATENT DOCUMENTS

| 0276790 | 8/1988 | European Pat. Off. . |
| 0601882 | 6/1994 | European Pat. Off. . |
| 63-45292B | 9/1988 | Japan . |

OTHER PUBLICATIONS

English language abstract of JP-B-45292/88.
English language abstract of EP 276,790.

*Primary Examiner*—Fred Zitomer
*Attorney, Agent, or Firm*—Birch, Stewart, Kolasch & Birch, LLP

[57] ABSTRACT

A thermoplastic resin composition comprising 100 parts by weight of a thermoplastic resin and 2 to 12 parts by weight of a thermoplastic resin oligomer containing 0.1 to 35% by weight of an aliphatic unsaturated group is molded with silicone rubber to form an integrally molded part. The thermoplastic resin composition maintains the inherent properties of the thermoplastic resin and firmly bonds with silicone rubber.

20 Claims, 4 Drawing Sheets

THERMOPLASTIC RESIN COMPOISTIONS FOR USE IN INTEGRAL MOLDING WITH SILICONE RUBBER AND INTEGRALLY MOLDED PARTS

BACKGROUND OF THE INVENTION

Field of the Invention

This invention relates to a thermoplastic resin composition for use in integral molding with silicone rubber and an integrally molded part of such a thermoplastic resin composition with silicone rubber which is useful in electric, electronic, automotive and precision machinery fields.

A number of techniques are known in the art for bonding addition curing type silicone rubber and organic resins. For example, a molded resin on the surface is coated with a primer and a curable silicone rubber is applied thereon and cured. Another joining technique is to cure a self-adhesive silicone rubber composition to a molded resin. There are available a number of patents relating to self-adhesive silicone rubber compositions, especially adhesive components thereof.

U.S. Pat. No. 4,582,762, U.S. Pat. No. 4,686,124, U.S. Pat. No. 4,814,231 and U.S. Pat. No. 4,834,721 corresponding to Japanese Patent Publication (JP-B) No. 34311/1990 disclose that an organopolysiloxane containing more than 30 mol % of a hydrogen atom directly attached to a silicon atom is added to an organic resin which is joined to an addition curing type silicone rubber. In JP-B 45292/1988, silicone rubber is physically fitted in an organic resin. EP 276,790 corresponding to Japanese Patent Application Kokai (JP-A) No. 183843/1988 discloses a method of integrally joining silicone rubber to an olefin resin having grafted thereto a compound having an aliphatic unsaturated group and a hydrolyzable group attached to a silicon atom. We proposed in U.S. Pat. No. 5,366,806 corresponding to JP-A 111981/1993 a method for integrally joining silicone rubber to a thermoplastic resin having added thereto a compound containing an unsaturated group and a hydrogen atom directly attached to a silicon atom.

These methods, however, have more or less problems. The method using a primer is cumbersome in that a resin molding must be taken out of the mold before a primer can be applied. The method of curing a self-adhesive silicone rubber material to a molded resin has the serious problem that when the silicone rubber-coated resin is molded in a mold, the silicone rubber itself adheres to the mold. Insofar as silicone rubber is applied and cured to resin moldings, no problem occurs on practical use. However, addition curable silicone self-adhesive compositions do not provide sufficient bonding forces when integrally molded with several of versatile resins, for example, ABS, PPO, PPS, polycarbonate, acryl, PE, PP and Teflon resins.

Among the above-mentioned proposals, the method of adding hydrogenpolysiloxane to olefin resins has the problem that it is difficult for the resin to exert its inherent properties because the properties of the resin itself can be altered by the siloxane added thereto. The physical engagement between silicone rubber and organic resin can be disrupted by physical forces. The use of an olefin resin having grafted thereto a compound having an aliphatic unsaturated group and a hydrolyzable group attached to a silicon atom requires a primer for the integration of an addition curing type silicone rubber.

As silicone rubber is recognized highly reliable with respect to heat resistance, weather resistance and electrical properties, it finds expanding application to electric, electronic and automotive fields. There is a strong desire to develop integrally molded parts having a thermoplastic resin firmly joined to silicone rubber.

SUMMARY OF THE INVENTION

An object of the present invention is to provide a thermoplastic resin composition which is well adhesive to silicone rubber and useful to form an integral molding with silicone rubber. Another object of the present invention is to provide an integrally molded part of such a thermoplastic resin composition with silicone rubber.

We have found that by blending 100 parts by weight of a thermoplastic resin with 2 to 12 parts by weight of a thermoplastic resin oligomer containing 0.1 to 35% by weight of an aliphatic unsaturated group, the thermoplastic resin can be significantly improved in adhesion to silicone rubber without altering the inherent properties of the thermoplastic resin. The resulting thermoplastic resin composition is firmly bondable with cured products of addition curing type silicone rubber compositions and thus well suited for forming integrally molded parts with silicone rubber. An integrally molded part of the thermoplastic resin composition with silicone rubber, especially a heat curable type silicone rubber composition comprising a silicon compound having at least one hydrogen atom attached to a silicon atom in a molecule as a tackifying component can be produced by an injection molding method because the thermoplastic resin composition and the silicone rubber can be effectively joined under brief curing conditions. Additionally, the silicone rubber itself is releasable from the mold in a practically acceptable manner. Then the integrally molded part of quality can be produced in an industrially advantageous manner.

In U.S. Pat. No. 5,366,805 corresponding to JP-A 171021/1994 and U.S. Pat. No. 5,418,065 corresponding to 171023/1994, we disclosed a strong integrally molded part using a thermoplastic resin having an aliphatic unsaturated group and a silicone rubber containing a specific adhesive component. However, preparation of a thermoplastic resin having an aliphatic unsaturated group is industrially less advantageous and less economical. The thermoplastic resin composition of the invention eliminates these problems and is industrially advantageous in this regard.

Accordingly, the present invention provides a thermoplastic resin composition for use in integral molding with silicone rubber, comprising 100 parts by weight of a thermoplastic resin and 2 to 12 parts by weight of a thermoplastic resin oligomer containing 0.1 to 35% by weight based on the oligomer of an aliphatic unsaturated group.

In another aspect, the invention provides an integrally molded part of the above-defined thermoplastic resin composition and silicone rubber.

BRIEF DESCRIPTION OF THE DRAWINGS

These and further features of the present invention will be apparent with reference to the following description and drawings, wherein.

DETAILED DESCRIPTION OF THE INVENTION

Figure 1A:
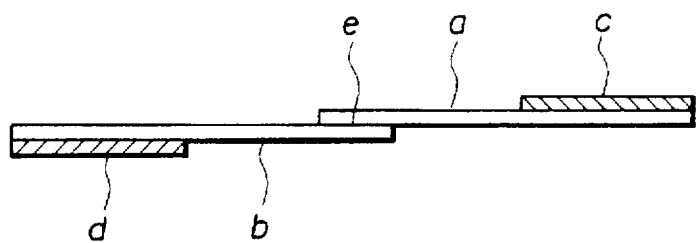
FIG. 1 illustrates a test specimen used in an adhesion test, FIG. 1(A) being a side view and FIG. 1(B) being a plan view.

Briefly stated, the thermoplastic resin composition of the invention is comprised of a thermoplastic resin and a thermoplastic resin oligomer containing an aliphatic unsaturated group.

The thermoplastic resins used herein include thermoplastic resins resulting from olefinic polymerization and thermoplastic resins resulting from polycondensation. Examples are ABS resins, styrene resins, polyethylene resins, polypropylene resins, acryl resins, polycarbonate resins, polyethylene terephthalate resins, polybutylene terephthalate resins, polyphenylene oxide resins, polyphenylene sulfide resins, polysulfone resins, nylon resins, and liquid crystal resins. Mixtures of such resins are also useful. Polycarbonate resins and polypropylene resins are preferred among others.

The thermoplastic resins used herein do not substantially contain an aliphatic unsaturated bond, and have a number average molecular weight of usually about 10,000 to 200,000, preferably about 15,000 to 100,000.

The thermoplastic resin oligomer containing an aliphatic unsaturated group is a compound having a unit constituting the above-mentioned thermoplastic resin and containing an aliphatic unsaturated group on a side chain or at an end. Useful are reactive groups capable of hydrosilylation with a hydrogen atom directly attached to a silicon atom in the presence of platinum series catalysts. In this respect, it is preferred to exclude compounds having an unsaturated group wherein both carbon atoms connected each other by an aliphatic unsaturated bond are all blocked with an alkyl or alkylene group other than a hydrogen atom, that is, compounds having an aliphatic unsaturated group inside a carbon-to-carbon linkage chain of a thermoplastic resin.

Since triple bonds tend to degrade the weather resistance and heat resistance of resins, preferred aliphatic unsaturated groups are monovalent olefin groups having a double bond such as alkenyl groups, especially non-internal olefinic groups having 2 to 4 carbon atoms, for example, vinyl, allyl, propenyl, isopropenyl, butenyl and isobutenyl groups.

The thermoplastic resin oligomer should contain 0.1 to 35% by weight, preferably 2 to 30% by weight of an aliphatic unsaturated group based on the weight of the entire oligomer. If the content of aliphatic unsaturated group is less than 0.1% by weight, no sufficient adhesion is achieved. If the content of aliphatic unsaturated group is more than 35% by weight, poor curing of silicone rubber can occur on the surface of the thermoplastic resin after solidification.

Preferably the oligomer has a number average molecular weight of 250 to 8,000, more preferably 500 to 5,000. Oligomers with a molecular weight of less than 250 would adversely affect the properties of solidified thermoplastic resin. Oligomers with a molecular weight of more than 8,000 would cause poor curing of silicone rubber on the surface of solidified thermoplastic resin.

More particularly, in order to maintain the properties of solidified thermoplastic resin, it is desirable that the oligomer have a high molecular weight. However, if a large amount of aliphatic unsaturated group is contained in one molecule, there can occur poor curing of silicone rubber on the surface of solidified thermoplastic resin. Then the amount of the oligomer is limited. Inversely, if the thermoplastic resin oligomer containing an aliphatic unsaturated group has a low molecular weight, it would adversely affect the properties of solidified thermoplastic resin. For the purposes of preventing any loss of the properties of the thermoplastic resin and poor curing of silicone rubber, it is then desirable to control the molecular weight of the thermoplastic resin oligomer and the content of aliphatic unsaturated group within the above-mentioned ranges.

These oligomers which are modified with aliphatic unsaturated groups in their molecule are not particularly limited as long as they are thermoplastic oligomers. From the standpoints of compatibility with resins and physical property retention, thermoplastic polycarbonate oligomers, thermoplastic polyester oligomers, and thermoplastic polypropylene oligomers are preferred.

Thermoplastic polycarbonate oligomers may be prepared by techniques as used for the preparation of conventional aromatic thermoplastic resins such as interfacial polymerization, pyridine, and chloroformate techniques except that dihydric phenols having an aliphatic unsaturated bond are used as a starting reactant and/or a monofunctional compound having an aliphatic unsaturated bond is used as a molecular weight modifier or terminal stopper.

Preferred dihydric phenols for use in the preparation of the thermoplastic polycarbonate oligomers are those of the following general formula (A).

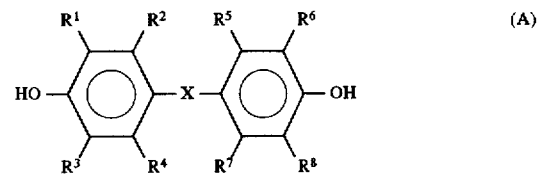

In formula (A), $R^1$ to $R^8$ are independently selected from a hydrogen atom, halogen atom, and substituted or unsubstituted alkyl, alkoxy, aryl and alkenyl groups having 1 to 8 carbon atoms, especially 1 to 6 carbon atoms. X is selected from the following groups:

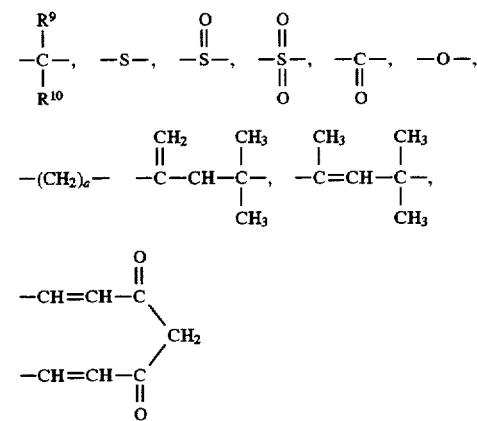

wherein $R^9$ and $R^{10}$ are independently selected from a hydrogen atom, halogen atom, and substituted or unsubstituted alkyl, aryl, alkenyl and alkynyl groups having 1 to 8 carbon atoms, especially 1 to 6 carbon atoms or taken together, form a carbocyclic ring or heterocyclic ring having 3 to 30 carbon atoms, especially 3 to 20 carbon atoms, and letter a is an integer of at least 1, especially 2 to 30.

The groups represented by $R^1$ to $R^8$, $R^9$ and $R^{10}$ are exemplified below. The halogen atoms include fluorine, chlorine and bromine. The substituted or unsubstituted alkyl groups include alkyl groups such as methyl, ethyl, propyl, isopropyl, butyl, isobutyl, tert-butyl, pentyl, hexyl, cyclohexyl, and octyl groups and halogenated alkyl groups such as chloromethyl, chloropropyl and trifluoropropyl groups; the substituted or unsubstituted alkoxy groups include methoxy, ethoxy, propoxy, butoxy, methoxyethoxy, and ethoxyethoxy groups; the substituted or unsubstituted aryl groups include phenyl, tolyl and xylyl groups; the substituted or unsubstituted alkenyl groups include vinyl, allyl, propenyl, isopropenyl, butenyl, isobutenyl, hexenyl, and cyclohexenyl groups. Examples of the alkynyl group include ethynyl, propynyl and butynyl groups.

Illustrative examples of the dihydric phenol include 2,2-bis(4-hydroxy-3-allylphenyl)propane, 2,4-bis(4-hydroxyphenyl)-4-methyl-1-pentene, 2,4-bis(4-hydroxyphenyl)-4-methyl-2-pentene, bis(4-hydroxyphenyl) methane, bis(4-hydroxyphenyl)ether, bis(4-hydroxyphenyl) sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl) propane or bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl) propane, 2,2-bis(4-hydroxy-3,5-dimethylphenyl)propane, 1,1-bis(4-hydroxyphenyl)-1-phenylethane, bis(4-hydroxyphenyl)diphenylmethane, 2,2-bis(4-hydroxy-3-methylphenyl)propane, and 1,7-bis(4-hydroxy-3-methoxyphenyl)-1,6-heptadiene-3,5-dione or curcumin. Mixtures of two or more dihydric phenols are also useful.

Illustrative examples of the monofunctional compound having an aliphatic unsaturated double bond used for introducing an unsaturated terminal group include unsaturated carboxylic acids such as acrylic acid, methacrylic acid, vinyl acetate, 2-pentenoic acid, 3-pentenoic acid, 5-hexenoic acid, 9-decenoic acid, and 9-undecenoic acid; acid chlorides and chloroformates such as acrylic chloride, methacrylic chloride, sorbic chloride, allyl chloroformate, isopropenyl phenyl chloroformate; phenols having an aliphatic unsaturated group such as isopropenylphenol, hydroxystyrene, o-allylphenol, eugenol, hydroxyphenyl maleimide, and allyl hydroxybenzoate; and vinylsilanes such as chloroformic acid dimethoxyvinylsilane and 3-carboxypropyldiethoxyvinylsilane. These compounds may be used in admixture of two or more. Insofar as at least one unsaturated double bond is contained in one molecule of polycarbonate oligomer on average, conventional terminal stoppers such as phenol and p-tert-butylphenol may be used instead or in combination with a monofunctional compound having an unsaturated double bond. These terminal stoppers are desirably used in amounts of 1 to 25 mol %, especially 1.5 to 10 mol % per mole of the dihydric phenol.

A branching agent may be used in an amount of 0.01 to 3 mol %, especially 0.1 to 1.0 mol % based on the dihydric phenol, obtaining branched polycarbonate. Examples of the branching agent include polyhydroxy compounds such as phloroglucin, 2,6-dimethyl-2,4,6-tri(4-hydroxyphenyl)-heptene-3, 4,6-dimethyl-2,4,6-tri(4-hydroxyphenyl) heptene-2, 1,3,5-tri(2-hydroxyphenyl)benzole, 1,1,1-tri(4-hydroxyphenyl)ethane, 2,6-bis(2-hydroxy-5-methylbenzyl)-4-methylphenol, and α,α',α"-tri(4-hydroxyphenyl)-1,3,5-triisopropylbenzene; and 3,3-bis(4-hydroxyphenyl) oxyindole also known as isatinbisphenol.

Preferred thermoplastic polyester oligomers are allyl esters synthesized by ester exchange reaction and condensation reaction between unsaturated monohydric alcohols or allyl halides and polyfunctional carboxylic acids or derivatives thereof. Also useful are unsaturated esters synthesized by polycondensation reaction between polyfunctional carboxylic acids or derivatives thereof and polyhydric alcohols.

Examples of the unsaturated monohydric alcohol used in the synthesis of the allyl esters include allyl alcohol and methallyl alcohol and an example of the allyl halide is allyl chloride. The polyfunctional carboxylic acids or derivatives thereof include phthalic acid, phthalic anhydride, and isophthalic acid.

Examples of the polyfunctional carboxylic acid used in the synthesis of the unsaturated esters include saturated polyfunctional carboxylic acids such as phthalic acid, isophthalic acid, adipic acid, sebacic acid, terephthalic acid, tetrahydrophthalic acid, tetrachlorophthalic acid, oxalic acid, malonic acid, succinic acid, and cyclopentadicarboxylic acid; and unsaturated polyfunctional carboxylic acids such as allyloxyisophthalic acid, allyloxyterephthalic acid, allylmalonic acid, maleic acid, maleic anhydride, fumaric acid, citraconic acid, mesaconic acid, itaconic acid, and tetrahydrophthalic acid.

Examples of the polyhydric alcohol include glycols such as ethylene glycol, propylene glycol, butane diol, hexamethylene glycol, hydrogenated bisphenol A, neopentyl glycol, diethylene glycol, triethylene glycol and dipropylene glycol; and alkenyl-containing ones such as glycerin monoallyl ether, trimethylolpropane monoallyl ether, pentaerythritol monoallyl ether, and pentaerythritol diallyl ether.

The thermoplastic polyester oligomers are synthesized in various ways from combinations of saturated polyfunctional carboxylic acids, unsaturated polyfunctional carboxylic acids, glycols, and polyhydric alcohols containing an alkenyl group. From the standpoints of cured properties, it is desirable to use saturated polyfunctional carboxylic acids, unsaturated polyfunctional carboxylic acids, and glycols as starting reactants.

Preferred thermoplastic polypropylene oligomers used herein are shown below.

(1) Copolymers of propylene with unconjugated diene comonomers of the following general formula.

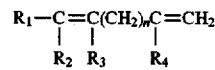

In the formula, $R_1$ to $R_4$ each are a hydrogen atom or an alkyl group having 1 to 20 carbon atoms, especially 1 to 10 carbon atoms, letter n is an integer of 1 to 20. Monomers having the structure of —$CH=C(CH_3)_2$ are excluded.

Examples of the unconjugated diene include 2-methyl-1,4-pentadiene, 1,4-hexadiene, 4-methyl-1,4-hexadiene, 1,4-heptadiene, 4-ethyl-1,4-hexadiene, 4-methyl-1,4-heptadiene, 4-ethyl-1,4-heptadiene, 1,5-heptadiene, 1,5-octadiene, 5-methyl-1,5-heptadiene, 2-methyl-1,5-hexadiene, 1,6-octadiene, 6-methyl-1,6-octadiene, 2-methyl-1,6-heptadiene, 1,9-decadiene, and 1,13-tetradecadiene. Also useful are cyclic unconjugated dienes such as vinylcyclohexene, vinyl norbornene, dicyclopentadiene, and ethylidene norbornene and trienes such as 1,3,7-octatriene and 1,5,9-decatriene. Preferred among others are 1,9-decadiene and 1,13-tetradecadiene. These unconjugated diene comonomers may be used in admixture of two or more.

For random copolymerization of propylene with unconjugated diene comonomers, conventional copolymerization methods using Ziegler-Natta catalysts may be used. Another unsaturated comonomer such as ethylene and butene-1 may be copolymerized in these random copolymers. The copolymers preferably have a melt flow rate (MFR) of 0.01 to 1,000 g/10 min. Note that the MFR is an index representing the fluidity of a copolymer. It is also acceptable to blend a random copolymer with a different type of polyolefin.

(2) Graft copolymers of unmodified polypropylene oligomers having dienes of the following general formula graft polymerized by radical methods.

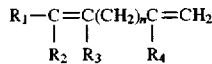

In the formula, $R_1$ to $R_4$ each are a hydrogen atom or an alkyl group having 1 to 20 carbon atoms, especially 1 to 10 carbon atoms, letter n is an integer of 1 to 20.

Examples of the diene include 1,3-butadiene, 2-methyl-1,4-pentadiene, 1,4-hexadiene, 4-methyl-1,4-hexadiene, 4-methyl-1,4-heptadiene, 4-ethyl-1,4-heptadiene, 1,5-heptadiene, 1,5-octadiene, 5-methyl-1,5-heptadiene, 2-methyl-1,5-hexadiene, 1,6-octadiene, 6-methyl-1,6-octadiene, 2-methyl-1,6-heptadiene, 1,9-decadiene, and 1,13-tetradecadiene. Also useful are cyclic unconjugated dienes such as vinylcyclohexene, vinyl norbornene, dicyclopentadiene, and ethylidene norbornene and trienes such as 1,3,7-octatriene and 1,5,9-decatriene. Preferred among others are 1,9-decadiene and 1,13-tetradecadiene. These unconjugated diene comonomers may be used in admixture of two or more.

For grafting dienes to unmodified polypropylene oligomers by a radical process, any desired technique may be used, for example, a solution technique of dissolving a polypropylene oligomer in an organic solvent such as xylene and toluene and adding a diene and a radical generator to the solution for reaction, and a melt kneading technique of melting and kneading a polypropylene oligomer, diene and radical generator in an extruder for reaction.

Preferred examples of the radical generator include peroxides such as benzoyl peroxide, lauroyl peroxide, di-tert-butyl peroxide, acetyl peroxide, tert-butyl peroxypivalate, 2,5-dimethyl-2,5-di-tert-butyl peroxyhexine, and t-butyl peroxyperbenzoate; and diazo compounds such as azobisisobutyronitrile. Desirably, 1 to 50 parts by weight of the radical generator is blended with 100 parts by weight of the monomer having an unsaturated bond. The graft copolymers preferably have a MFR of 0.01 to 1,000 g/10 min. It is also acceptable to blend a graft copolymer with a different type of polyolefin.

(3) Polypropylene oligomers which are produced by a process involving a first stage of copolymerizing a monomer having both an aliphatic unsaturated bond and a functional group with propylene or graft polymerizing the monomer to an unmodified polypropylene oligomer by a radical process, and a second stage of reacting the product with a molecule having another functional group capable of reacting with the functional group through copolymerization or grafting and an unsaturated bond, thereby introducing the unsaturated bond into the polypropylene oligomer.

In the first stage, examples of the monomer used include acrylamide, methacrylamide, glycidyl methacrylate, glycidyl acrylate, glycidyl allyl ether, N-[4-(2,3-epoxypropoxy)-3,5-dimethylbenzyl]acrylamide, maleic anhydride, 1,2,3-benzentricarboxylic acid, acrylic acid, acrylamine, 2-hydroxyethyl methacrylate, m-isopropenyl-α,α-dimethylbenzyl isocyanate, vinyl oxazoline, and vinyl alcohol.

For copolymerizing propylene with the comonomer having an unsaturated bond, a living polymerization technique may be used (see JP-A 252614/1985). Another unsaturated comonomer such as ethylene and butene-1 may be copolymerized in these copolymers. The copolymers preferably have a MFR of 0.01 to 1,000 g/10 min.

For grafting the monomer having an unsaturated bond to an unmodified polypropylene oligomer by a radical process, any desired technique may be used, for example, a solution technique of dissolving an unmodified polypropylene oligomer in an organic solvent such as xylene and toluene and adding the monomer and a radical generator to the solution for reaction, and a melt kneading technique of melting and kneading a polypropylene oligomer, unconjugated diene and radical generator in an extruder for reaction.

Preferred examples of the radical generator or initiator include peroxides such as benzoyl peroxide, lauroyl peroxide, di-tert-butyl peroxide, acetyl peroxide, tert-butyl peroxybenzoate, dicumyl peroxide, peroxybenzoic acid, peroxyacetic acid, tert-butyl peroxypivalate, 2,5-dimethyl-2,5-di-tert-butyl peroxyhexine, and t-butyl peroxyperbenzoate; and diazo compounds such as azobisisobutyronitrile. Desirably, 1 to 50 parts by weight of the radical generator is blended with 100 parts by weight of the monomer having an unsaturated bond. The graft copolymers preferably have a MFR of 0.01 to 1,000 g/10 min.

In the second stage, the monomer used is determined by the monomer used in the first stage. Where maleic anhydride or 1,2,3-benzentricarboxylic acid is used in the first stage, the second stage uses monomers having an epoxy group such as glycidyl methacrylate, glycidyl acrylate, glycidyl allyl ether, and N-[4-(2,3-epoxypropoxy)-3,5-dimethylbenzyl]acrylamide, monomers having an amino group such as allylamine, monomers having an amide group such as acrylamide and methacrylamide, 2-hydroxyethyl methacrylate, m-isopropenyl-α,α-dimethylbenzyl isocyanate, vinyl oxazoline, and vinyl alcohol.

Where monomers having an epoxy group such as glycidyl methacrylate, glycidyl acrylate, glycidyl allyl ether, and N-[4-(2,3-epoxypropoxy)-3,5-dimethylbenzyl]acrylamide are used in the first stage, the second stage uses maleic anhydride, 1,2,3-benzentricarboxylic acid, allylamine having an amino group, acrylamide and methacrylamide having an amide group, and acrylic acid having a carboxyl group. Where allylamine having an amino group, acrylamide and methacrylamide having an amide group are used in the first stage, the second stage uses monomers having an epoxy group such as glycidyl methacrylate, glycidyl acrylate, glycidyl allyl ether, and N-[4-(2,3-epoxypropoxy)-3,5-dimethylbenzyl]acrylamide, maleic anhydride, and 1,2,3-benzentricarboxylic acid.

For the second stage of reaction, any desired technique may be used, for example, a solution technique of dissolving a polypropylene oligomer resulting from the first stage in an organic solvent such as xylene and toluene and adding a monomer to the solution for reaction, and a melt kneading technique of melting and kneading a polypropylene oligomer resulting from the first stage and a monomer in an extruder for reaction.

The polypropylene oligomers having an unsaturated bond introduced therein preferably have a MFR of 0.01 to 1,000 g/10 min. It is also acceptable to blend a polypropylene oligomer with a different type of polyolefin.

(4) Resin compositions comprising polypropylene oligomer blended with at least one of the following groups (a) and (b).

Group (a): ethylene-propylene-diene rubber using ethylidene norbornene, dicyclopentadiene or 1,4-hexadiene as a diene component, butadiene copolymers, 1,2-polybutadiene, and terminal double bond polyolefins.

Group (b): silica surface treated with silane coupling agents containing an unsaturated bond in a molecule and glass fibers.

The preferred silane coupling agents used herein are silane coupling agents having an unsaturated bond such as vinyltrimethoxysilane, vinyltriethoxysilane, vinyltris(2-methoxyethoxy)silane, and 3-methacryloxypropyltrimethoxysilane.

According to the present invention, 100 parts by weight of the thermoplastic resin is blended with 2 to 12 parts by weight, preferably 3 to 10 parts by weight of the thermoplastic oligomer containing an aliphatic unsaturated group to form a thermoplastic resin composition. Thermoplastic resin compositions containing less than 2 parts of the thermoplastic oligomer are less adhesive to addition type silicone rubber whereas compositions containing more than 12 parts of the thermoplastic oligomer cause poor curing of addition type silicone rubber compositions.

It is noted that the thermoplastic resin is blended with the thermoplastic resin oligomer by well-known heat mixing techniques such as kneader mixing and continuous extrusion kneading techniques whereupon the blend is pelletized.

For producing molded parts from the thermoplastic resin composition, conventional thermoplastic resin molding techniques may be used. One well-known technique is by pelletizing the thermoplastic resin composition, admitting it into a mold heated above the softening point of the thermoplastic resin, and cooling the mold to below the softening point. To this end, molding machines such as injection molding machines and transfer molding machines may be used.

Next, the silicone rubber to be integrally molded with the thermoplastic resin is described. The silicone rubber to be molded on molded parts of thermoplastic resin may take a liquid, putty or paste form in an uncured state. For ease of molding, liquid or paste silicone rubber compositions known as liquid silicone rubber are desirable.

The silicone rubber composition to be integrated with the thermoplastic resin is preferably of the heat curing type. Included are silicone rubber compositions curable with organic peroxides and silicone rubber compositions curable through addition reaction. Addition curing type silicone rubber compositions are desirable because they can be molded in a short time.

Typical addition curing type silicone rubber compositions contain (a) 100 parts by weight of an alkenyl group-containing organopolysiloxane, (b) an organohydrogenpolysiloxane having at least two hydrogen atoms each attached to a silicon atom in a molecule, in such an amount that the equivalent ratio of the hydrogen atom attached to a silicon atom (that is, SiH group) to the alkenyl group in component (a) may range from 0.4:1 to 5.0:1, (c) a catalytic amount of an addition reaction catalyst, (d) 0.1 to 50 parts by weight of an adhesive agent, and (e) 0 to 50 parts by weight of finely divided silica having a specific surface area of at least 50 m²/g.

The alkenyl group-containing organopolysiloxane (a) is selected from well-known organopolysiloxanes commonly used as a base component of conventional addition curing type silicone rubber compositions. It is preferably of the following compositional formula:

$$R_aSiO_{(4-a)/2}$$

wherein R is a substituted or unsubstituted monovalent hydrocarbon group and letter a is a positive number of 1.9 to 2.4. It generally has a viscosity of about 100 to 300,000 centipoise at 25° C., preferably 1,000 to 100,000 centipoise at 25° C.

In the formula, R is preferably selected from substituted or unsubstituted monovalent hydrocarbon groups having 1 to 12 carbon atoms, preferably having 1 to 10 carbon atoms, for example, saturated hydrocarbon groups, typically alkyl and cycloalkyl groups such as methyl, ethyl, propyl, isopropyl, butyl, isobutyl, tert-butyl, hexyl, cyclohexyl, octyl and decyl, unsaturated hydrocarbon groups, typically alkenyl groups such as vinyl, propenyl, allyl, isopropenyl, hexenyl, cyclohexenyl, and butenyl, aryl groups such as phenyl and xylyl, aralkyl groups such as benzyl and phenylethyl, and halo- and cyano-substituted hydrocarbon groups such as 3,3,3-trifluoropropyl and cyanoethyl. Although the substituents represented by R may be identical or different, the organopolysiloxane must contain two or more alkenyl groups in a molecule. Basically the substituents on the silicon atom may be any of the above-mentioned groups. Preferably the alkenyl group is vinyl while methyl and phenyl groups are desirably introduced as other substituents. The alkenyl group may be attached to a silicon atom at the end or intermediate of a molecular chain, preferably a silicon atom at the end of a molecular chain. Letter a has a value in the range of 1.9 to 2.4, preferably 1.95 to 2.25.

The organopolysiloxane may be either a linear one or a branched one partially containing a $RSiO_{3/2}$ or $RSiO_{4/2}$ unit. Most often, it is a linear diorganopolysiloxane having a backbone consisting essentially of recurring $R_2SiO_{2/2}$ units and terminated with a $R_3SiO_{1/2}$ unit at each end of a molecular chain.

This organopolysiloxane can be prepared by conventional well-known methods, for example, by effecting equilibration reaction between an organocyclopolysiloxane and a hexaorganodisiloxane in the presence of an alkali or acid catalyst.

Examples of organopolysiloxane (a) are given below.

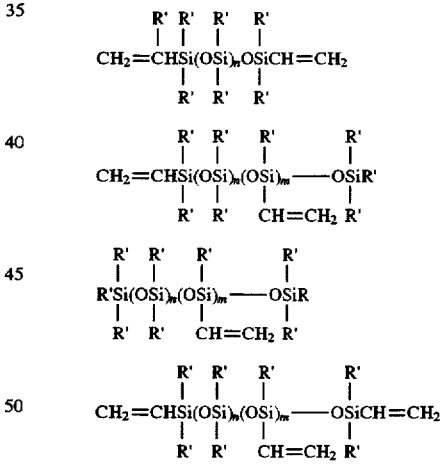

In these formulae, R' has the same meaning of R other than aliphatic unsaturated hydrocarbon groups, and letters m and n are positive integers sufficient to provide a viscosity within the above-defined range.

Component (b) is an organohydrogenpolysiloxane which serves as a crosslinking agent by reacting with component (a). It is not particularly limited in molecular structure and may be any of conventionally used organohydrogenpolysiloxanes of linear, cyclic, branched and three-dimensional network structures. However, it should have at least two, preferably at least three hydrogen atoms each directly attached to a silicon atom (that is, SiH groups) in a molecule.

The substituent or substituents R' attached to a silicon atom other than hydrogen are substituted or unsubstituted monovalent hydrocarbon groups having 1 to 12 carbon atoms, preferably having 1 to 10 carbon atoms and free of an aliphatic unsaturated bond as described for the substituent R in organopolysiloxane (a).

The organohydrogenpolysiloxane generally has a viscosity of 1 to 1,000 centipoise at 25° C., preferably 5 to 200 centipoise at 25° C. It is preferably of the following general formula:

$$R'_b H_c SiO_{(4-b-c)/2}$$

wherein R' is a substituted or unsubstituted monovalent hydrocarbon group having 1 to 12 carbon atoms, preferably having 1 to 10 carbon atoms and free of an aliphatic unsaturated bond, letter b ranges from 0.7 to 2.1, preferably 1 to 2, letter c ranges from 0.002 to 1, preferably 0.01 to 0.6, and the sum of b and c is 0.8 to 3, preferably 1.5 to 2.6.

Examples of the organohydrogenpolysiloxanes include methylhydrogenpolysiloxanes blocked with trimethylsiloxy groups at both ends, dimethylsiloxane-methylhydrogenpolysiloxane copolymers blocked with trimethylsiloxy groups at both ends, dimethylsiloxanes blocked with dimethylhydrogensiloxy groups at both ends, dimethylsiloxanes blocked with dimethylhydrogenpolysiloxy groups at both ends, dimethylsiloxane-methylhydrogenpolysiloxane copolymers blocked with dimethylhydrogenpolysiloxy groups at both ends, methylhydrogenpolysiloxane-diphenylsiloxane-dimethylsiloxane copolymers blocked with trimethylsiloxy groups at both ends, copolymers composed of $(CH_3)_2HSiO_{1/2}$ units and $SiO_{4/2}$ units, copolymers composed of $(CH_3)_2HSiO_{1/2}$ units, $SiO_{4/2}$ units and $(C_6H_5)SiO_{3/2}$ units, and the like.

The organohydrogenpolysiloxanes are preferably liquid at room temperature (for example, 25° C.) and preferably have a viscosity of 0.1 to 500 cps, more preferably 0.5 to 300 cps. The organohydrogenpolysiloxanes have usually 3 to 300, preferably 4 to 100 Si atoms.

The organohydrogenpolysiloxanes may be prepared by per se known methods. For example, the most commonly used method is by equilibrating octamethylcyclotetrasiloxane and/or tetramethylcyclotetrasiloxane and a compound containing a hexamethyldisiloxane or 1,1'-dihydro-2,2',3,3'-tetramethyldisiloxane unit which will become a terminal group in the presence of a catalyst such as sulfuric acid, trifluoromethanesulfonic acid, and methanesulfonic acid at a temperature between −10° C. and +40° C.

Component (b) is preferably added in an amount to provide 0.4 to 5 equivalents, especially 0.8 to 2 equivalents of the hydrogen atom attached to a silicon atom (that is, SiH group) per alkenyl group in component (a). Less than 0.4 equivalent of component (b) on this basis would result in cured silicone rubber having a too low crosslinking density and hence, less heat resistance. More than 5 equivalents of component (b) would give rise to a bubbling problem due to dehydrogenation reaction, also adversely affecting heat resistance.

Component (c) is a catalyst for promoting addition reaction or hydrosilylation between components (a) and (b). It may be a well-known catalyst. Examples are platinum and platinum compounds including platinum black, chloroplatinic acid, alcohol modified chloroplatinic acid, complexes of chloroplatinic acid with olefins, aldehydes, vinylsiloxanes or acetylene alcohols. Platinum group metal compounds such as rhodium complexes are also useful. The amount of the catalyst added is suitably determined in accordance with a desired curing rate although it is generally in the range of 0.1 to 1,000 ppm, preferably 1 to 200 ppm of platinum or rhodium based on the weight of component (a).

Adhesive agent (d) is preferably an organic silicon compound, which is typically selected from linear, cyclic and branched siloxanes having at least one hydrogen atom directly attached to a silicon atom (that is, SiH group) in a molecule.

More preferably, the adhesive agent is an organosiloxane oligomer compound having 3 to 50 silicon atoms, preferably 4 to 20 silicon atoms in its molecule, and having at least one, usually 1 to 10, preferably 2 to 6 hydrogen atom directly attached to a silicon atom and a group selected from the class consisting of a substituted or unsubstituted, mono- to trivalent, aromatic ring-containing group, ester group, epoxy-containing organic group such as glycidyloxyalkyl group, (3,4-epoxycyclohexyl)-alkyl group, dialkoxysilyl group such as methyldimethoxysilyl group, trialkoxysilyl group such as trimethoxysilyl group, triethoxysilyl group, dialkenyloxysilyl group, trialkenyloxysilyl group, and acid anhydride group.

The organic silicon compound may be any desired one as long as it has at least one hydrogen atom directly attached to a silicon atom (preferably at least two hydrogen atoms) and at least one epoxy and/or alkoxysilyl group attached to a silicon atom through a carbon atom directly attached to the silicon atom. For ease of synthesis, compounds having a cyclic polysiloxane skeleton are preferred. Among the compounds having a cyclic polysiloxane skeleton, compounds having a siloxane ring consisting of 3 to 6 silicon atoms, especially 4 silicon atoms are preferred for ease of synthesis. In the case of linear organic silicon compounds, a siloxane chain consisting of about 3 to 50, preferably 5 to 20 silicon atoms is desirable, though not limited, because compounds having a higher molecular weight are extremely viscous and inconvenient to synthesize and handle.

The epoxy-containing organic group is preferably an epoxy group attached to a silicon atom through a divalent hydrocarbon group such as alkylene group as shown below.

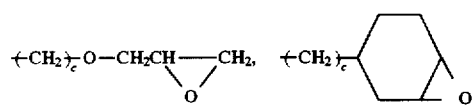

Letter c is equal to 1, 2, 3 or 4.

Examples of the alkoxy group in the dialkoxysilyl and trialkoxysilyl groups include those having 1 to 4 carbon atoms such as methoxy, ethoxy, propoxy, isopropoxy, butoxy, isobutoxy, tert-butoxy, methoxymethoxy, methoxyethoxy, ethoxymethoxy, and ethoxyethoxy groups. Examples of the alkenyloxy group in the dialkenyloxysilyl and trialkenyloxysilyl groups include those having 1 to 4 carbon atoms such as vinyloxy, allyloxy, propenyloxy, isopropenyloxy, and butenyloxy groups.

The hydrogen atom attached to a silicon atom (SiH group) is preferably one attached to a silicon atom intermediate a molecular chain, that is, a silicon atom in a difunctional siloxane unit =$SiO_{2/2}$. Other than the above-mentioned functional groups, there may be contained an organic group attached to a silicon atom which includes substituted or unsubstituted monovalent hydrocarbon groups having 1 to 10 carbon atoms and free of an aliphatic unsaturated bond as described for R and R', especially methyl and phenyl groups.

Preferred among the above-mentioned organic silicon compounds are those having an epoxy, alkoxy, alkenyloxy or carboxy anhydride group in a molecule. Examples of the preferred organic silicon compound are given below.

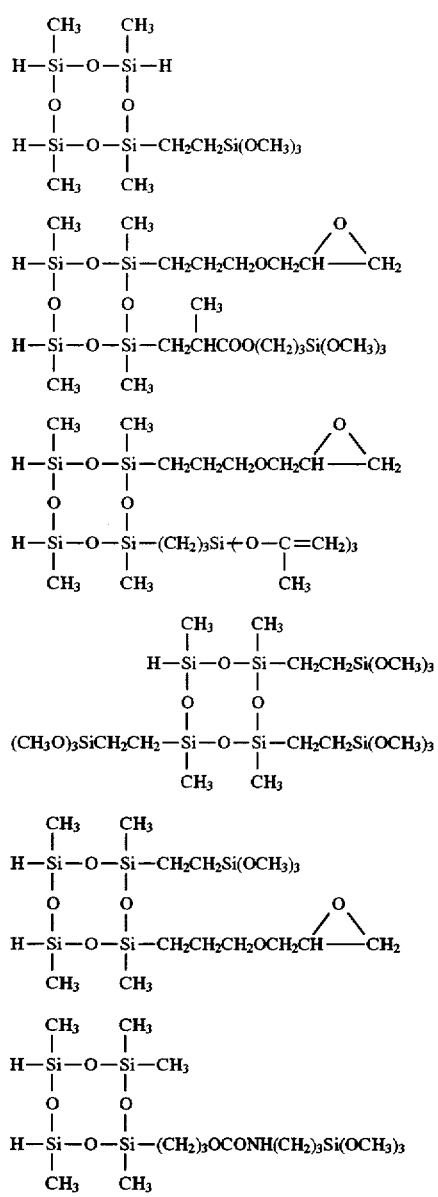

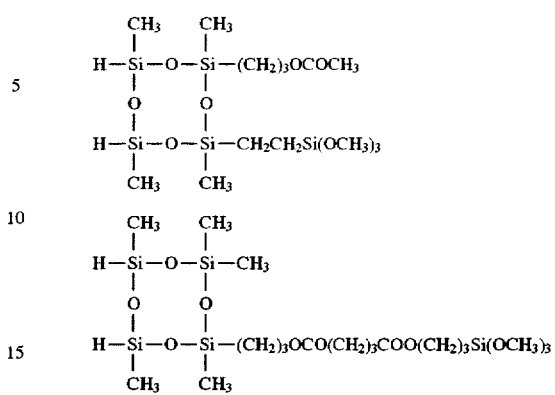

In one preferred embodiment of the invention, the above-mentioned compounds are used as component (d). Although silicone rubber compositions containing such compounds as component (d) are fully adhesive, the fully adhesive compositions can also adhere to metal molding machines, typically metal molds if such molding machines are used. The problem may be overcome by using a less adhesive material at the surface of the molding machine, for example, by applying a coating of Teflon resin to the molding machine. This method, however, is less reliable from the standpoint of service life.

Where sticking is a problem, it is recommended to use a compound free of an epoxy, alkoxy or carboxy anhydride group as the adhesive agent. There are used compounds which are effectively adhesive to thermoplastic resins or compositions containing the same, but less adhesive to metals, for example, silicon compounds such as linear, cyclic or branched organosiloxane oligomer having 2 to 20, preferably 4 to 12 silicon atoms in its molecule and having at least one, usually 1 to 20, preferably 2 to 10 SiH group in a molecule and a group containing 1 to 3 substituted or unsubstituted mono- to trivalent aromatic rings of phenyl or phenylene skeleton or an alkylene group having 2 to 30 carbon atoms. Illustrative examples of the silicon compound are given below.

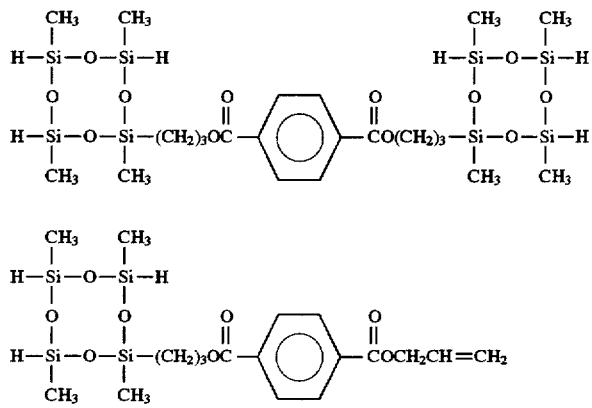

-continued
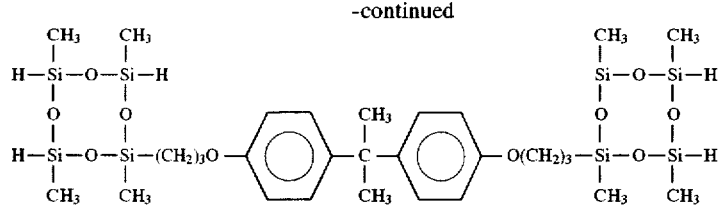
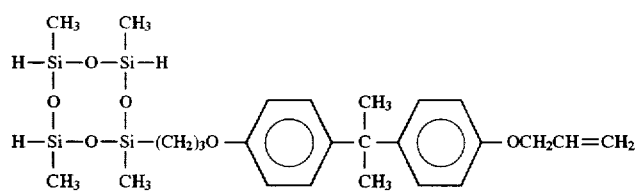
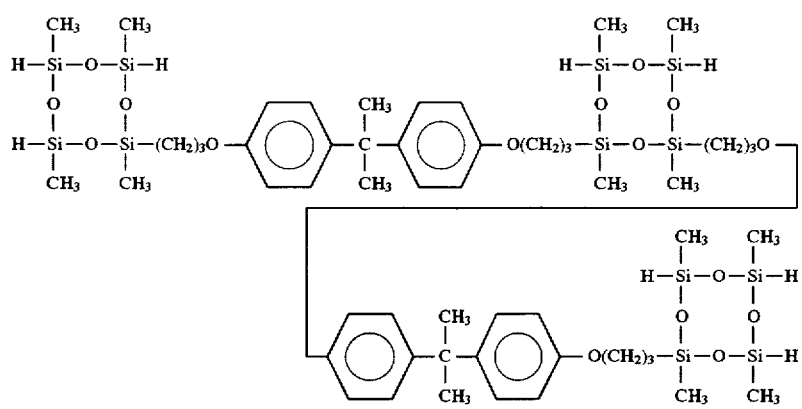
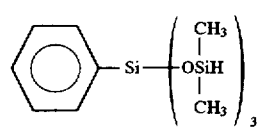
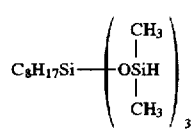
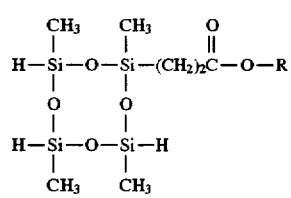
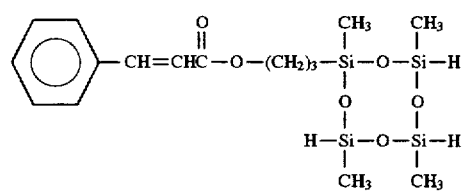
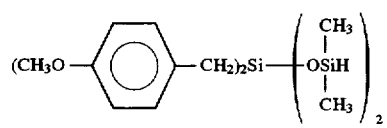

-continued

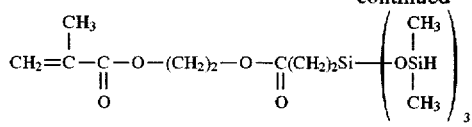

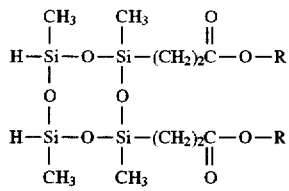

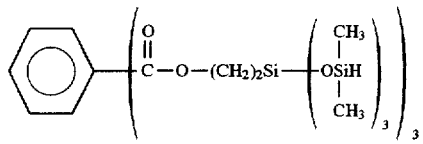

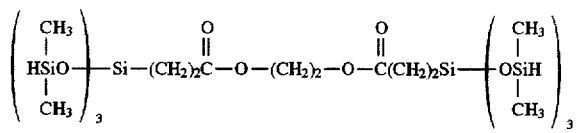

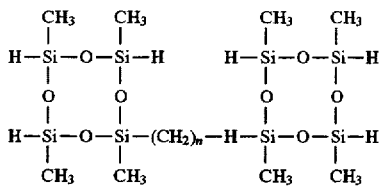

Note that n is 2 to 30 and R is as defined above.

Preferably 0.05 to 30 parts, more preferably 0.1 to 10 parts by weight of the adhesive agent is blended with 100 parts by weight of organopolysiloxane (a). Less than 0.05 part of the adhesive agent is insufficient to impart adhesion whereas more than 30 parts of the adhesive agent would allow bubbling during curing and detract from the mechanical properties of cured products.

Component (e) is finely divided silica having a specific surface area of at least 50 m²/g in BET. It is effective for imparting strength when the silicon rubber composition cures into an elastomer. For such reinforcement purposes, silica should have a specific surface area of at least 50 m²/g, preferably 50 to 400 m²/g.

Finely divided silica is commercially available. For example, hydrophilic silica is available as Aerosil 130, 200 and 300 from Nihon Aerosil K.K. and Degussa Inc., Cabosil MS-5 and MS-7 from Cabot Corp., Rheorosil QS-102 and 103 from Tokuyama Soda K.K., and Nipsil LP from Nihon Silica K.K. Hydrophobic silica is available as Aerosil R-812, R-812S, R-972 and R-974 from Degussa Inc., Rheorosil MT-10 from Tokuyama Soda K.K., and Nipsil SS from Nihon Silica K.K.

Preferably 0 to 200 parts, more preferably 5 to 150 parts by weight of the finely divided silica is blended with 100 parts by weight of organopolysiloxane (a).

Where it is necessary to adjust the curing time in order that the silicone rubber composition be commercially acceptable, an appropriate curing control agent may be added. Exemplary control agents are vinyl-containing organopolysiloxanes such as vinylcyclotetrasiloxane, triallylisocyanurate, alkyl maleates, acetylene alcohols and silane and siloxane modified products thereof, hydroperoxide, tetramethylethylenediamine, benzotriazole and mixtures thereof. There may also be added non-reinforcing fillers such as quartz powder, diatomaceous earth and calcium carbonate; coloring agents, for example, inorganic pigments such as cobalt blue and organic dyes; and heat resistance and flame retardance modifiers such as cerium oxide, zinc carbonate, manganese carbonate, iron oxide, titanium oxide, and carbon black.

The silicone rubber composition may be prepared by mixing the above-mentioned components and agitating in a kneader or the like in a conventional manner. Curing conditions include a temperature of 20° to 150° C. and a time of 10 seconds to 1 hour.

According to the present invention, an uncured silicone rubber composition of the above-mentioned formulation is integrally molded with a thermoplastic resin composition of the above-mentioned formulation. One method involves the steps of previously molding a thermoplastic resin composition, placing a desired shape of an uncured silicone rubber composition on the thermoplastic resin preform, and heating above the melting temperature of the thermoplastic resin. This method may use a mold or rely on coating or dipping. Another method involves the steps of previously molding a thermoplastic resin composition, placing an uncured silicone rubber composition on the thermoplastic resin preform, and heating and compressing below the melting temperature of the thermoplastic resin. A further method uses an injection molding machine and involves the steps of injection molding a thermoplastic resin composition in a mold and then heating and injecting an addition type silicone rubber composition into the mold.

The thermoplastic resin composition for integral molding with silicone rubber according to the invention maintains the inherent properties of thermoplastic resin and is fully adhesive to a silicone rubber composition. The thermoplastic resin composition is best suited for forming integrally molded parts with a silicone rubber composition. The integrally molded parts consisting of a thermoplastic resin composition and a silicone rubber composition are of quality while the integral molding process can be carried out in an industrially advantageous manner.

EXAMPLE

Examples of the present invention are given below by way of illustration and not by way of limitation. All parts are by weight.

Reference Example
Preparation of silicone rubber composition

A liquid addition curing type silicone rubber composition was prepared by charging a kneader with 100 parts of a dimethylsiloxane polymer blocked with a dimethylvinylsilyl group at each end of a molecular chain and having a viscosity of 10,000 centipoise at 25° C., 40 parts of fumed silica having a specific surface area of 300 m²/g, 8 parts of hexamethyldisilazane, and 1 part of water, mixing them at room temperature for 1 hour, heating at 150° C., and mixing at the temperature for 2 hours. The mixture was then cooled down to room temperature. To the mixture were added 20 parts of the dimethylsiloxane polymer blocked with a dimethylvinylsilyl group at each end and having a viscosity of 10,000 centipoise at 25° C., 3 parts of hydrogenmethylpolysiloxane of formula (I) shown below having a viscosity of about 10 centipoise at 25° C., 4 parts of a vinylmethylpolysiloxane containing 5 mol % of a vinyl group directly attached to a silicon atom in the form of (—Si(CH₃) (CH=CH₂)O—) and having a viscosity of 1,000 centipoise at 25° C., 0.1 part of acetylene alcohol for extending the curing time at room temperature, and 50 ppm calculated as platinum atom of a platinum vinylsiloxane complex. Mixing was continued until a uniform blend was obtained.

$$CH_3-\underset{\underset{CH_3}{|}}{\overset{\overset{CH_3}{|}}{Si}}-\left(OSi\underset{\underset{H}{|}}{\overset{\overset{CH_3}{|}}{}}\right)_5\left(OSi\underset{\underset{CH_3}{|}}{\overset{\overset{CH_3}{|}}{}}\right)_8 OSi\underset{\underset{CH_3}{|}}{\overset{\overset{CH_3}{|}}{}}-CH_3 \quad (I)$$

Examples 1–3 and Comparative Examples 1–3

An injection molding machine for thermoplastic resin was used. A resin blend of 100 parts of a polycarbonate resin containing substantially no aliphatic unsaturated groups and a number average molecular weight of about 15,000 and 3 parts of a polycarbonate oligomer terminally modified with an isopropenyl group (isopropenyl group content 4% by weight, number average molecular weight 2,100) was admitted into the molding machine where the resin was plasticized at 290° C. and then injected into multiple sheet-shaped cavities of a mold. The injection molding conditions included an injection time of 6 seconds, a cooling time of 30 seconds, an injection pressure of 1,000 kg/cm², a clamping pressure of 35 ton, and a cavity temperature of 100° C. A plurality of sheets of 25 mm wide×100 mm long×2 mm thick were obtained. The sheets were set in a jig for forming a tensile shear adhesion test specimen.

Separately, silicone rubber compositions were prepared by adding 2 parts of a compound of formula (II), (III) or (IV) as an adhesive agent to 100 parts of the liquid addition curing type silicone rubber composition obtained in Reference Example.

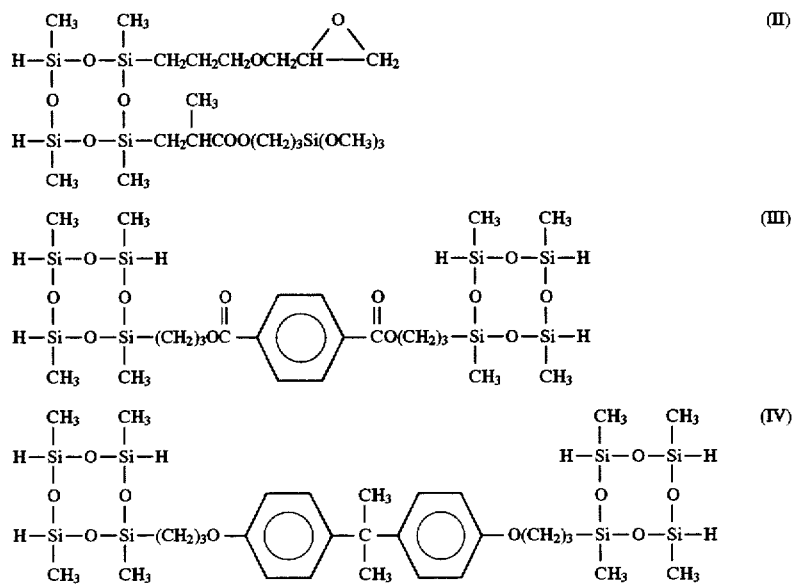

A proper amount of each silicone rubber composition was poured into the jig whereupon it was heated in a constant temperature tank at 120° C. for 8 minutes for curing the silicone rubber composition to the thermoplastic resin sheet. In this way, there were obtained specimens as shown in FIG. 1, which were tested for adhesion or bonding force.

More particularly, as a result of integral molding, supports c and d lay on one end portions of thermoplastic resin sheets a and b. The sheets were overlapped at other ends through the silicone rubber layer to form a lap joint e, completing a test specimen.

The specimens were evaluated for adhesion according to the evaluation of tensile shear bond strength of adhesive prescribed in JIS K 6850.

Figure 1B:
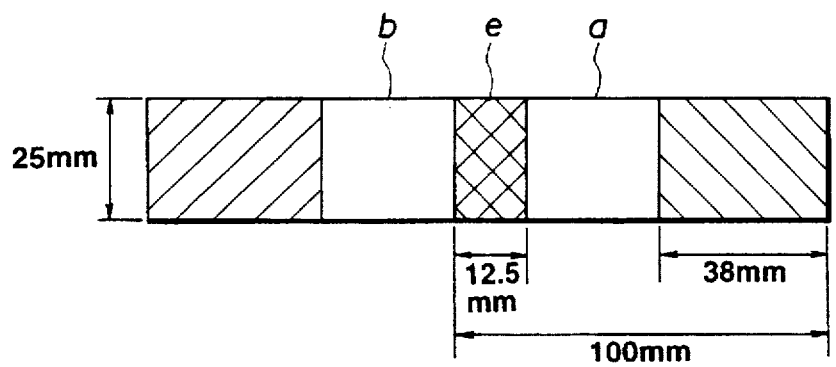

For comparison purposes, specimens as shown in FIG. 1 were prepared by the same molding procedure under the same conditions as in Example 1 except that a resin blend of 100 parts of the polycarbonate resin and 1 part of the polycarbonate oligomer terminally modified with an isopropenyl group was used as the thermoplastic resin. The specimens were examined for adhesion by the same test as above. The results are shown in Table 1.

TABLE 1

|  | Examples 1–3 | Comparative Examples 1–3 |
|---|---|---|
| Adhesive agent (II) | bonded | separated |
| Adhesive agent (III) | bonded | separated |
| Adhesive agent (IV) | bonded | separated |

"bonded" means that the adhesive strength was over 25 kgf/cm$^2$ and the cohesive failure of the silicone rubber occurred by a tensile shear adhesive test according to JIS-K-6850.

Examples 4–6 and Comparative Examples 4–6

An injection molding machine for thermoplastic resin was used. A resin blend of 100 parts of an ABS resin (acrylonitrile-butadiene-styrene copolymer) containing substantially no aliphatic unsaturated group and 5 parts of a polybutylene terephthalate oligomer terminally modified with an allyl group (allyl group content 5% by weight, number average molecular weight 1,800) was admitted into the molding machine where the resin was plasticized at 250° C. and then injected into multiple sheet-shaped cavities of a mold. The injection molding conditions included an injection time of 6 seconds, a cooling time of 30 seconds, an injection pressure of 1,000 kg/cm$^2$, a clamping pressure of 35 ton, and a cavity temperature of 80° C. A plurality of sheets of 25 mm×100 mm×2 mm thick were obtained. The sheets were set in a jig for forming a tensile shear adhesion test specimen.

Separately, silicone rubber compositions were prepared by adding 2 parts of a compound of formula (II), (III) or (IV) as an adhesive agent to 100 parts of the liquid addition curing type silicone rubber composition obtained in Reference Example. A proper amount of each silicone rubber composition was poured into the jig whereupon it was heated in a constant temperature tank at 100° C. for 8 minutes for curing the silicone rubber composition to the thermoplastic resin sheet. In this way, there were obtained specimens as shown in FIG. 1, which was tested for adhesion as in Example 1. The results are shown in Table 2.

For comparison purposes, specimens as shown in FIG. 1 were prepared by the same molding procedure under the same conditions as in Example 4 except that a resin blend of 100 parts of the ABS resin and 1 part of the polybutylene terephthalate oligomer terminally modified with an allyl group was used as the thermoplastic resin. The specimens were examined for adhesion by the same test as above. The results are shown in Table 2.

TABLE 2

|  | Examples 4–6 | Comparative Examples 4–6 |
|---|---|---|
| Adhesive agent (II) | bonded | separated |
| Adhesive agent (III) | bonded | separated |
| Adhesive agent (IV) | bonded | separated |

"bonded" means that the adhesive strength was over 25 kgf/cm$^2$ and the cohesive failure of the silicone rubber occurred by a tensile shear adhesive test according to JIS-K-6850.

Examples 7–9 and Comparative Examples 7–9
Preparation of thermoplastic polypropylene oligomer containing an unsaturated group Random copolymerization of propylene and 1,9-decadiene was carried out at 70° C. using a propylene polymerizing catalyst based on a Ziegler-Natta catalyst of titanium trichloride. The random copolymer had a number average molecular weight of 4,800 and contained 1% by weight of an aliphatic unsaturated group calculated as a vinyl group.

Molding

A resin blend of 100 parts of a polypropylene resin containing substantially no aliphatic unsaturated groups and a number average molecular weight of about 100,000 and 5 parts of the polypropylene oligomer modified as above was admitted into an injection molding machine where the resin was plasticized at 250° C. and then injected into multiple sheet-shaped cavities of a mold. The injection molding conditions included an injection time of 6 seconds, a cooling time of 30 seconds, an injection pressure of 1,000 kg/cm$^2$, a clamping pressure of 35 ton, and a cavity temperature of 80° C. A plurality of sheets of 25 mm×100 mm×2 mm thick were obtained. The sheets were set in a jig for forming a tensile shear adhesion test specimen.

Separately, silicone rubber compositions were prepared by adding 2 parts of a compound of formula (II), (III) or (IV) as an adhesive agent to 100 parts of the liquid addition curing type silicone rubber composition obtained in Reference Example. A proper amount of each silicone rubber composition was poured into the jig whereupon it was heated in a constant temperature tank at 100° C. for 8 minutes for curing the silicone rubber composition to the thermoplastic resin sheet. In this way, there were obtained specimens as shown in FIG. 1, which was tested for adhesion as in Example 1. The results are shown in Table 3.

For comparison purposes, specimens as shown in FIG. 1 were prepared by the same molding procedure under the same conditions as in Example 7 except that a resin blend of 100 parts of the polypropylene resin and 1 part of the modified polypropylene oligomer was used as the thermoplastic resin. The specimens were examined for adhesion by the same test as above. The results are shown in Table 3.

TABLE 3

|  | Examples 7–9 | Comparative Examples 7–9 |
|---|---|---|
| Adhesive agent (II) | bonded | separated |
| Adhesive agent (III) | bonded | separated |
| Adhesive agent (IV) | bonded | separated |

"bonded" means that the adhesive strength was over 25 kgf/cm$^2$ and the cohesive failure of the silicone rubber occurred by a tensile shear adhesive test according to JIS-K-6850.

Examples 10–11 and Comparative Examples 10–11

Figure 2:
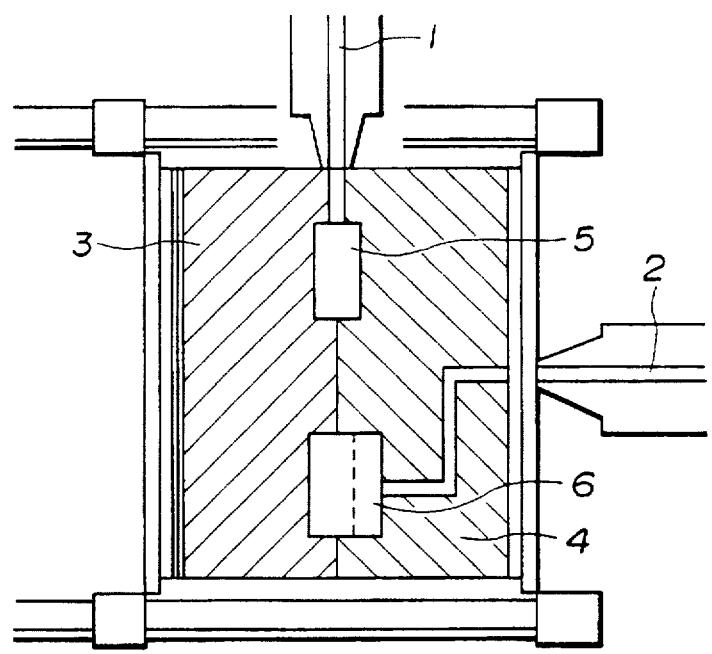
FIG. 2 is a schematic view of a two-color injection molding apparatus for use in the manufacture of an integrally molded part according to the invention.

A co-injection molding machine having two injection means as shown in FIG. 2 was used. In this molding machine, the injection means terminate at nozzles 1 and 2 which are connected to a mold as shown in FIG. 2. The nozzle 1 extends along a parting line and the nozzle 2 extends perpendicular to one side surface of the mold at the center. The mold consists of a left mold half 3 and a right mold half 4 whose inside surfaces are recessed to define two cavities 5 and 6 when mated.

Figure 3:
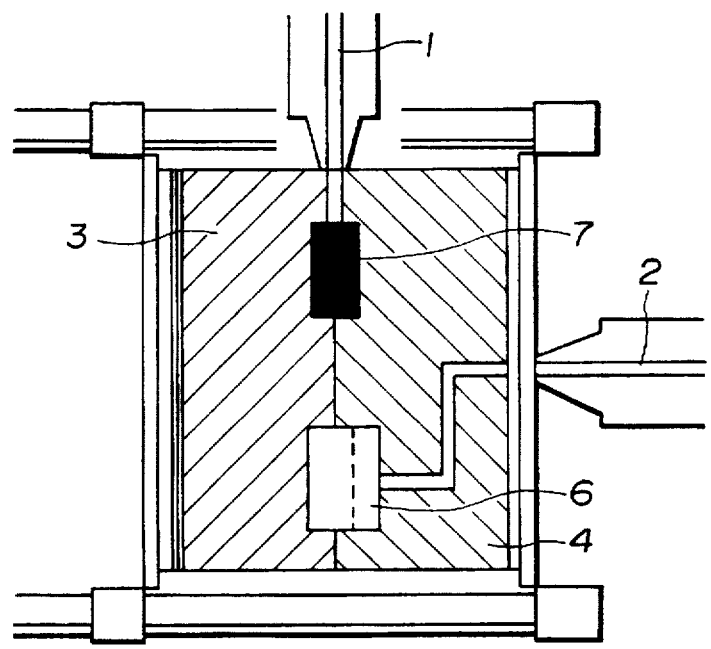
FIGS. 3 to 5 illustrate successive steps of manufacturing an integrally molded part using the two-color injection molding apparatus.

A resin blend of 100 parts of a polycarbonate resin containing substantially no aliphatic unsaturated groups and a number average molecular weight of about 15,000 and 5 parts of a polycarbonate oligomer terminally modified with an isopropenyl group (isopropenyl group content 4% by weight, number average molecular weight 2,100) was admitted into the upper injection means where it was melted at 290° C. and injected into the cavity 5 through the nozzle 1 to mold a resin sheet 7 as shown in FIG. 3. The injection molding conditions included an injection time of 6 seconds, a cooling time of 35 seconds, and a temperature of 100° C. at the cavity 5 and left mold half 3.

Figure 4:
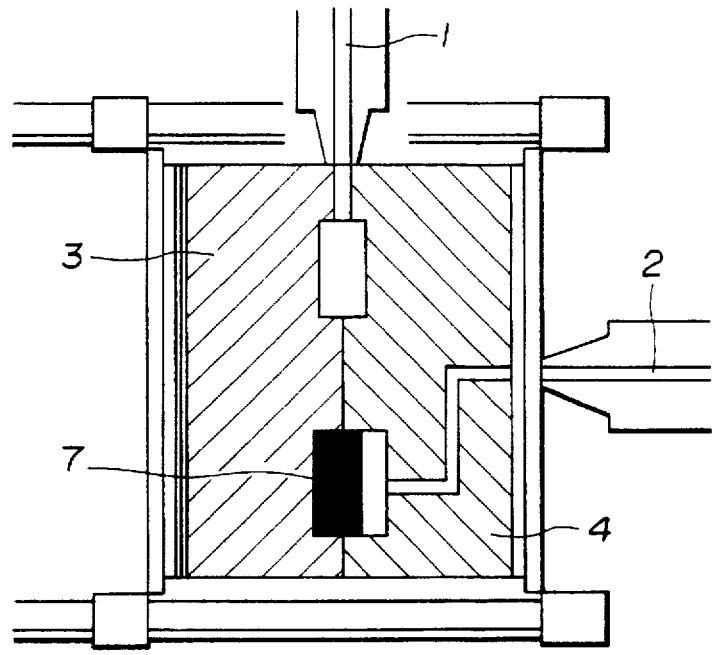

Then the right mold half 4 was removed to open the mold. The left mold half 3 was rotated 180° with the molded resin sheet 7 retained in its cavity. The right mold half 4 was mated again and clamped, thereby defining a silicone rubber molding cavity between the exposed surface of the molded resin sheet 7 and the cavity wall of the right mold half 4 as shown in FIG. 4.

Figure 5:
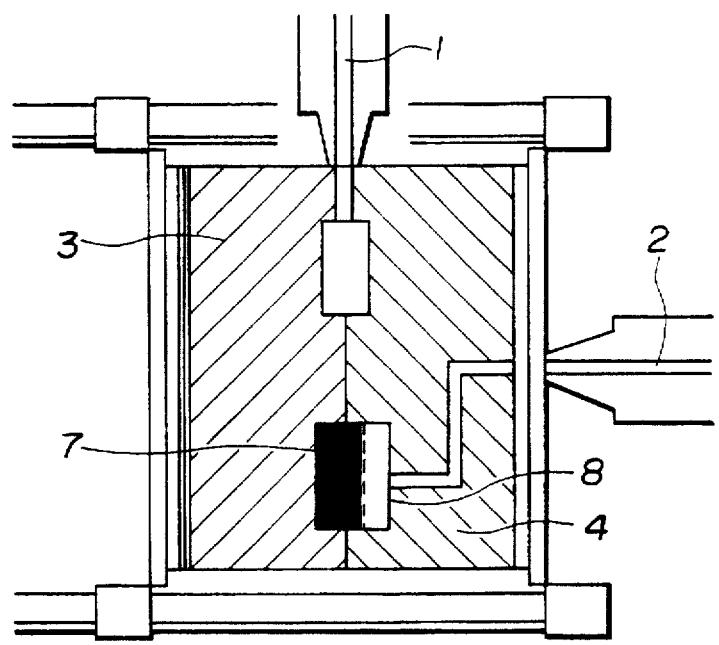
Figure 6:
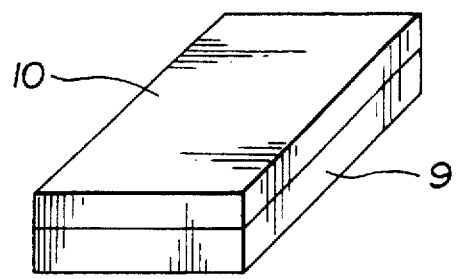
FIG. 6 is a perspective view of an integrally molded part according to the invention.

In this state, a blend of 100 parts of the liquid addition curing type silicone rubber composition and 0.5 or 1 part of the compound of formula (III) or (IV) was injection molded through the nozzle 2 to mold a rubber sheet 8 on the molded resin sheet 7 as shown in FIG. 5. The injection molding conditions included an injection time of 6 seconds, a curing time of 90 seconds, a left mold half 3 temperature of 100° C., and a right mold half 4 temperature of 120° C. The above-mentioned two stage molding process resulted in a composite body consisting of a resin sheet 9 and a rubber sheet 10 which were both dimensioned 2.5 mm wide×150 mm long×2 mm thick as shown in FIG. 6. The composite moldings using the silicone rubber compositions containing 0.5 and 1 part of the compounds of formulae (III) and (IV) all showed a firm bond at the joint and were excellent in dimensional precision and productivity.

For comparison purposes, composite bodies as shown in FIG. 6 were prepared by the same injection procedure under the same conditions as above except that a resin blend of 100 parts of the polycarbonate resin and 13 parts of the polycarbonate oligomer terminally modified with an isopropenyl group was used as the thermoplastic resin. They were examined for adhesion to find poor curing of the silicone rubber at the interface with the resin.

Japanese Patent Application No. 337186/1994 and 202815/1995 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A thermoplastic resin composition for use in integral molding with silicone rubber, comprising 100 parts by weight of a first thermoplastic resin having a number average molecular weight of 10,000 to 200,000 and 2 to 12 parts by weight of a second thermoplastic resin containing 0.1 to 30% by weight of an aliphatic unsaturated group and having a number average molecular weight of 250 to 8,000.

2. The thermoplastic resin composition of claim 1 wherein the first thermoplastic resin is selected from the group consisting of ABS resins, styrene resins, polyethylene resins, polypropylene resins, acryl resins, polycarbonate resins, polyethylene terephthalate resins, polybutylene terephthalate resins, polyphenylene oxide resins, polyphenylene sulfide resins, polysulfone resins, nylon resins, and liquid crystal resins, and the second thermoplastic resin is selected from the group consisting of thermoplastic polycarbonate oligomers, thermoplastic polyester oligomers, and thermoplastic polypropylene oligomers.

3. The thermoplastic resin composition of claim 1, further comprising a silicone rubber.

4. The thermoplastic resin composition of claim 3 wherein the silicone rubber is a cured product of an addition curing type silicone rubber composition comprising
   (a) 100 parts by weight of an alkenyl group-containing organopolysiloxane,
   (b) an organohydrogenpolysiloxane having at least two hydrogen atoms each attached to a silicon atom in a molecule, in such an amount that the equivalent ratio of the hydrogen atom attached to a silicon atom (that is, SiH group) to the alkenyl group in component (a) may range from 0.4:1 to 5.0:1,
   (c) a catalytic amount of an addition reaction catalyst,
   (d) 0.1 to 50 parts by weight of an adhesive agent, and
   (e) 0 to 50 parts by weight of finely divided silica having a specific surface area of at least 50 m²/g.

5. The thermoplastic resin composition of claim 4 wherein the adhesive agent is an organosiloxane oligomer compound having 3 to 50 silicon atoms in its molecule, having at least one hydrogen atom directly attached to a silicon atom and a group selected from the class consisting of a substituted or unsubstituted, mono- to trivalent, aromatic ring-containing group, ester group, epoxy-containing organic group, dialkoxysilyl group, trialkoxysilyl group, dialkenyloxysilyl group, trialkenyloxysilyl group, and acid anhydride group.

6. The thermoplastic resin composition of claim 4 wherein the adhesive agent is an organosiloxane oligomer having 2 to 20 silicon atoms in its molecule, and at least one SiH group in a molecule and a group containing 1 to 3 substituted or unsubstituted mono- to trivalent aromatic rings of phenyl or phenylene skeleton or an alkylene group having 2 to 30 carbon atoms.

7. An integrally molded part of a thermoplastic resin composition as set forth in claim 1 and silicone rubber.

8. The integrally molded part of claim 7 wherein said first thermoplastic resin is a polycarbonate resin.

9. The integrally molded part of claim 7 wherein said first thermoplastic resin is a polypropylene resin.

10. The integrally molded part of claim 7 wherein the silicone rubber is a cured product of an addition curing type silicone rubber composition comprising
   (a) 100 parts by weight of an alkenyl group-containing organopolysiloxane,
   (b) an organohydrogenpolysiloxane having at least two hydrogen atoms each attached to a silicon atom in a molecule, in such an amount that the equivalent ratio of the hydrogen atom attached to a silicon atom (that is, SiH group) to the alkenyl group in component (a) may range from 0.4:1 to 5.0:1,
   (c) a catalytic amount of an addition reaction catalyst,
   (d) 0.1 to 50 parts by weight of an adhesive agent, and (e) 0 to 50 parts by weight of finely divided silica having a specific surface area of at least 50 m²/g.

11. The integrally molded part of claim 10 wherein the adhesive agent is an organosiloxane oligomer compound having 3 to 50 silicon atoms in its molecule, having at least one hydrogen atom directly attached to a silicon atom and a group selected from the class consisting of a substituted or unsubstituted, mono- to trivalent, aromatic ring-containing group, ester group, epoxy-containing organic group, dialkoxysilyl group, trialkoxysilyl group, dialkenyloxysilyl group, trialkenyloxysilyl group, and acid anhydride group.

12. The integrally molded part of claim 10 wherein the adhesive agent is an organosiloxane oligomer having 2 to 20 in its molecule, and at least one SiH group in a molecule and a group containing 1 to 3 substituted or unsubstituted mono- to trivalent aromatic rings of phenyl or phenylene skeleton or an alkylene group having 2 to 30 carbon atoms.

13. The integrally molded part of claim 7, wherein the silicone rubber is a cured product of an addition curing type silicone rubber composition comprising:

(a) 100 parts by weight of an alkenyl group-containing organopolysiloxane, (b) an organohydrogenpolysiloxane having at least two hydrogen atoms each attached to a silicon atom in a molecule, in such an amount that the equivalent ratio of the hydrogen atom attached to a silicone atom (that is, SiH group) to the alkenyl group in component (a) may range from 0.4:1 to 5.0:1, (c) a catalytic amount of an addition reaction catalyst, (d) 0.1 to 50 parts by weight of an adhesive agent, and (e) 0 to 50 parts by weight of finely divided silica having a specific surface area of at least 50 m²/g.

14. The integrally molded part of claim 13, wherein the adhesive agent is an organosiloxane oligomer compound having 3 to 50 silicon atoms in its molecule, having at least one hydrogen atom directly attached to a silicon atom and a group selected from the class consisting of a substituted or unsubstituted, mono- to trivalent, aromatic ring-containing group, ester group, epoxy-containing organic group, dialkoxysilyl group, trialkoxysilyl group, dialkenyloxysilyl group, trialkenyloxysilyl group, and acid anhydride group.

15. The integrally molded part of claim 13, wherein the adhesive agent is an organosiloxane oligomer having 2 to 20 silicon atoms in its molecule, and at least one SiH group in a molecule and a group containing 1 to 3 substituted or unsubstituted mono- to trivalent aromatic rings of phenyl or phenylene skeleton or an alkylene group having 2 to 30 carbon atoms.

16. The thermoplastic resin composition of claim 1, wherein the amount of said second thermoplastic resin is 3 to 10 parts by weight.

17. The thermoplastic resin composition of claim 1, wherein the first thermoplastic resin has a number average molecular weight of 15,000 to 100,000.

18. The thermoplastic resin composition of claim 1, wherein said second thermoplastic resin contains 2 to 30% by weight of said aliphatic unsaturated group.

19. The thermoplastic resin composition of claim 1, wherein said second thermoplastic resin has a number average molecular weight of 500 to 5,000.

20. The thermoplastic resin composition of claim 5, wherein the organosiloxane oligomer compound has 4 to 20 silicone atoms in its molecule.

* * * * *